United States Patent
Charles et al.

(10) Patent No.: US 9,639,240 B2
(45) Date of Patent: May 2, 2017

(54) COMPUTER-IMPLEMENTED METHOD FOR LAUNCHING AN INSTALLED APPLICATION

(71) Applicant: Dassault Systemes, Velizy Villacoublay (FR)

(72) Inventors: Bernard Charles, Velizy Villacoublay (FR); Dominique Florack, Velizy Villacoublay (FR); Monica Menghini, Velizy Villacoublay (FR); Hubert Masson, Velizy Villacoublay (FR)

(73) Assignee: Dassault Systemes, Velizy-Villacoublay (FR)

( * ) Notice: Subject to any disclaimer, the term of this patent is extended or adjusted under 35 U.S.C. 154(b) by 550 days.

(21) Appl. No.: 14/157,513

(22) Filed: Jan. 16, 2014

(65) Prior Publication Data

US 2014/0208241 A1    Jul. 24, 2014

(30) Foreign Application Priority Data

Jan. 18, 2013 (EP) .................................... 13305066

(51) Int. Cl.
*G06F 3/0482* (2013.01)
*G06F 9/445* (2006.01)
*G06F 3/0481* (2013.01)

(52) U.S. Cl.
CPC ........ *G06F 3/0482* (2013.01); *G06F 3/04815* (2013.01); *G06F 9/445* (2013.01)

(58) Field of Classification Search
CPC .......... G06F 3/00; G06F 3/048; G06F 3/0481; G06F 3/0482; G06F 3/04815; G06F 9/44; G06F 9/445; G06F 13/00; G06F 15/16; G06F 15/173; G06F 17/30; G06T 17/00; G06T 17/20; G06T 19/00; G06Q 50/00
See application file for complete search history.

(56) References Cited

U.S. PATENT DOCUMENTS

| | | | |
|---|---|---|---|
| 5,859,978 | A | 1/1999 | Sonderegger et al. |
| 6,173,289 | B1 | 1/2001 | Sonderegger et al. |

(Continued)

FOREIGN PATENT DOCUMENTS

| | | |
|---|---|---|
| WO | WO 2008/082360 A1 | 7/2008 |
| WO | WO 2009/055692 A2 | 4/2009 |

OTHER PUBLICATIONS

European Search Report, European Application No. 13305066, "A Computer-Implemented Method For Launching An Installed Application", Date of Mailing: Jul. 5, 2013.

*Primary Examiner* — Xiomar L Bautista
(74) *Attorney, Agent, or Firm* — Hamilton, Brook, Smith & Reynolds, P.C.

(57) ABSTRACT

A computer-implemented method for launching an installed application comprising the steps of:
  providing a web browser;
  displaying in the web browser a first list of at least one three-dimensional object;
  selecting at least one three-dimensional object among said first list;
  determining a second list of at least one installed application(s) able to use the selected object(s) of the first list;
  displaying in the web browser said second list;
  selecting an application in said second list; and
  launching said selected application of said second list together with the opening of the selected object(s) of the first list.

16 Claims, 9 Drawing Sheets

(56) References Cited

U.S. PATENT DOCUMENTS

| | | | |
|---|---|---|---|
| 7,010,757 B2 * | 3/2006 | Stana | G06F 9/445 |
| | | | 715/760 |
| 9,405,433 B1 * | 8/2016 | Jackson | G06F 3/0482 |
| 2002/0093532 A1 * | 7/2002 | Stana | G06F 9/445 |
| | | | 715/760 |
| 2008/0189627 A1 * | 8/2008 | Nikitin | G06F 3/0481 |
| | | | 715/762 |
| 2010/0081375 A1 * | 4/2010 | Rosenblatt | G08C 17/02 |
| | | | 455/41.1 |
| 2010/0315416 A1 * | 12/2010 | Pretlove | G06T 7/001 |
| | | | 345/419 |
| 2011/0277027 A1 * | 11/2011 | Hayton | H04L 63/0815 |
| | | | 726/8 |

* cited by examiner ated application. Such a procedure is relatively time consuming and leads to many potential errors, because the web design and navigation parts are completely separated.

COMPUTER-IMPLEMENTED METHOD FOR LAUNCHING AN INSTALLED APPLICATION

RELATED APPLICATION

This application claims priority to European Application No. 13305066.6 filed on Jan. 18, 2013. The entire teachings of the above application are incorporated herein by reference.

FIELD OF THE INVENTION

The invention relates to the field of computers programs and systems, and more specifically to the field of computer-implemented method for launching an installed application.

BACKGROUND

It is known to use a web browser to view different three-dimensional objects, generally shared among several users and stored on a server, and accessible with a corresponding software application.

When a user, especially in the field of three-dimensional computer-aided design software applications, wants to work with one of these three-dimensional objects, after authenticating himself or login, he must open the object, usually directly from the software application.

Then, the user must identify and launch a specific and relevant application to work with this object, and generally re-authenticate himself for each object he wants to use. Such a procedure is relatively time consuming and leads to many potential errors, because the web design and navigation parts are completely separated.

Product edition systems are known to include Computer-Aided Design or CAD, which relates to software solutions for authoring product design. Similarly, CAE is an acronym for Computer-Aided Engineering, e.g. it relates to software solutions for simulating the physical behavior of a future product. CAM stands for Computer-Aided Manufacturing and typically includes software solutions for defining manufacturing processes and operations.

A number of products and programs are offered on the market for the design of objects (or parts) or assemblies of objects, forming a product, such as the one provided by Dassault Systèmes under the trademark CATIA. These CAD systems allow a user to construct and manipulate complex three dimensional (3D) modeled objects or assemblies of objects.

These CAD systems manage parts or assemblies of parts as modeled objects, which are mostly specifications of geometry. Specifically, CAD files contain specifications, from which geometry is generated, which in turn allow for a representation to be generated. Geometry and representation may be stored in a single CAD file or multiple ones. Alternatively, they may be stored in the form of indexed and searchable data.

CAD systems include graphic tools for representing the modeled objects to the designers; these tools are dedicated to the display of complex objects—the typical size of a file representing an object in a CAD system being in the range of one Megabyte per part, and an assembly may comprise thousands of parts. A CAD system manages models of objects, which are stored in electronic files. From a CAD systems standpoint, an object is basically a file which comprises at least a name. These files can be stored on databases. Databases are structured to facilitate storage, retrieval, modification, and deletion of data in conjunction with various data-processing operations. Databases generally consist of a file or set of files that can be broken down into records, each of which consist of one or more fields. Fields are the basic units of data storage. Users retrieve database information primarily through queries. Using keywords and sorting commands, users can rapidly search, rearrange, group, and select the field in many records to retrieve or create reports on particular aggregates of data according to the rules of the database management system being used.

CAD systems include graphic tools for representing the modeled objects to the designers. These tools are dedicated to the creation, the display, the modification of complex objects. In particular, the modification of the property of an object, or the part of an object, can be made via the modification of one or more parameter that determines the property of the object.

Objects to be used can equally be objects from software applications to drive production performance and innovation throughout the supply chain, such as the one provided by Dassault Systèmes under the trademark DELMIA, or be objects from software applications to design optimization and manage simulation data, such as the one provided by Dassault Systèmes under the trademark SIMULIA.

All these applications are three-dimensional-based applications and can be simply called three-dimensional applications or 3D applications, in the following of the present patent application.

Moreover, social and collaborative applications such as the one provided by Dassault Systèmes under the trademark ENOVIA also known as Product Data Management (PDM) may incorporate 3D applications of functionalities, for instance for visualizing and managing three-dimensional modeled objects.

SUMMARY OF THE INVENTION

A goal of the invention is to provide a computer-implemented method and a system to overcome the above mentioned problems.

It is proposed, according to one aspect of the invention, a computer-implemented method for launching an installed application comprising the steps of:
  providing a web browser;
  displaying in the web browser a first list of at least one three-dimensional object;
  selecting at least one three-dimensional object among said first list;
  determining a second list of at least one installed application(s) able to use the selected object(s) of the first list;
  displaying in the web browser said second list;
  selecting an application in said second list; and
  launching said selected application of said second list together with the opening of the selected object(s) of the first list.

Such a method permits to simplify the use of three-dimensional objects are shared among users, limiting the risks of login errors, limiting the risks of object selecting errors with a such clear displaying of the first list of 3D-objects, as well as accelerating the design process by reducing the number of steps. No error is permitted as no incompatible application is proposed.

Thus, the user can be guided to the use of applications already installed application compatible with the object(s) he uses, or he has recently used, or suggest him to use new application(s) available on the store online, with use of methods such as "people who have used this application have also used these other applications".

Moreover, the user can be guided to the use of applications in function of the industrial sector in which he works, and/or his role in his company.

According to an embodiment, said first list is stored on a server connected to the memory means storing said three-dimensional object(s), and said application(s) of said second list is (are) stored on a client.

The implementation of the invention in a client-server architecture is particularly well suited to the domain.

According to an embodiment, the Graphical User Interface of said web browser and said selected application are identical and at the step of launching of said selected application the options of its presentation are matched with the options of presentations of the web browser.

Thus, the user can have a perfect continuity between the uses of the web browser and the application.

According to an embodiment, said launching of said selected application with several three-dimensional objects of said first list, storable on different data bases, is adapted to automatically reveal and launch several corresponding instances of the application.

Thus, if the user wants to use several objects stored in different databases accessible by the server, from the web browser, he just has to select them and choose an application of the proposed second list, able to use the objects and installed on the client of the user, and automatically, several instances of the application are opened, necessary to use the objects stored in the different data. Thus, for the user, everything is simple and automatic.

The web browser and the application(s) of the second list can have an identical command tool.

Thus, it is easy to the user to switch between an application of the second list and the web browser or another application of the second list.

According to an embodiment, said second list comprises three-dimensional Computer-Aided Design application(s), and/or Computer-Aided Engineering application(s) and/or Computer-Aided Manufacturing application(s).

According to an embodiment, an installed application is eligible for said second list, if it is an authorized licensed application.

Thus only licensed application are proposed.

It is proposed, according to another aspect of the invention, a computer-readable medium having computer-executable instructions to cause the computer system to perform the method for launching an installed application as described above.

It is proposed, according to another aspect of the invention, a computer program product, stored on a computer readable medium, for launching an installed application, comprising code means for causing the system to take the steps as described above.

It is proposed, according to another aspect of the invention, an apparatus for launching an installed application of a computer-aided system comprising means for implementing the steps of the method as described above.

BRIEF DESCRIPTION OF THE DRAWINGS

The invention will be better understood with the study of some embodiments described by way of non-limiting examples and illustrated by the accompanying drawings wherein:

FIG. 2 illustrates the displaying in the web browser of a list of at least one installed applications able to use the selected object(s);

DETAILED DESCRIPTION

Following figures explain more in details the functioning of the present invention.

On the different figures, elements with a same reference are similar.

Figure 1:
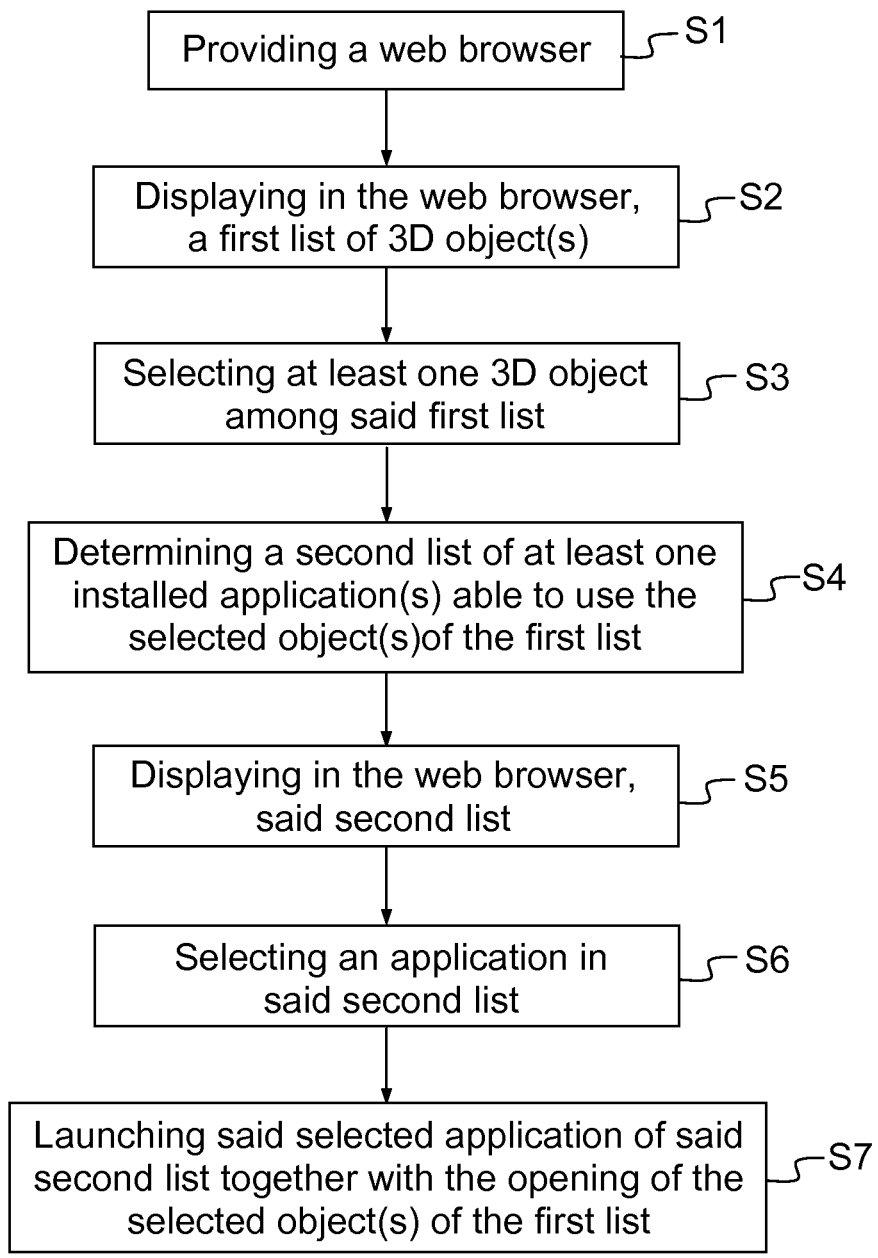
FIG. 1 illustrates a method according to an aspect of the invention.

On FIG. 1 is represented the steps of the computer-implemented method for launching an installed application according to one aspect of the invention, comprising:
- a step S1 of providing a web browser;
- a step S2 of displaying in the web browser a first list of at least one three-dimensional object;
- a step S3 of selecting at least one three-dimensional object among said first list;
- a step S4 of determining a second list of at least one installed application(s) able to use the selected object(s) of the first list;
- a step S5 of displaying in the web browser said second list;
- a step S6 of selecting an application in said second list; and
- a step S7 of launching said selected application of said second list together with the opening of the selected object(s) of the first list.

In the sense of the invention, an installed application also known as native application is an application that is already installed locally on the client. In addition, it may be contrasted with a Web application that is run within the browser.

Figure 2:
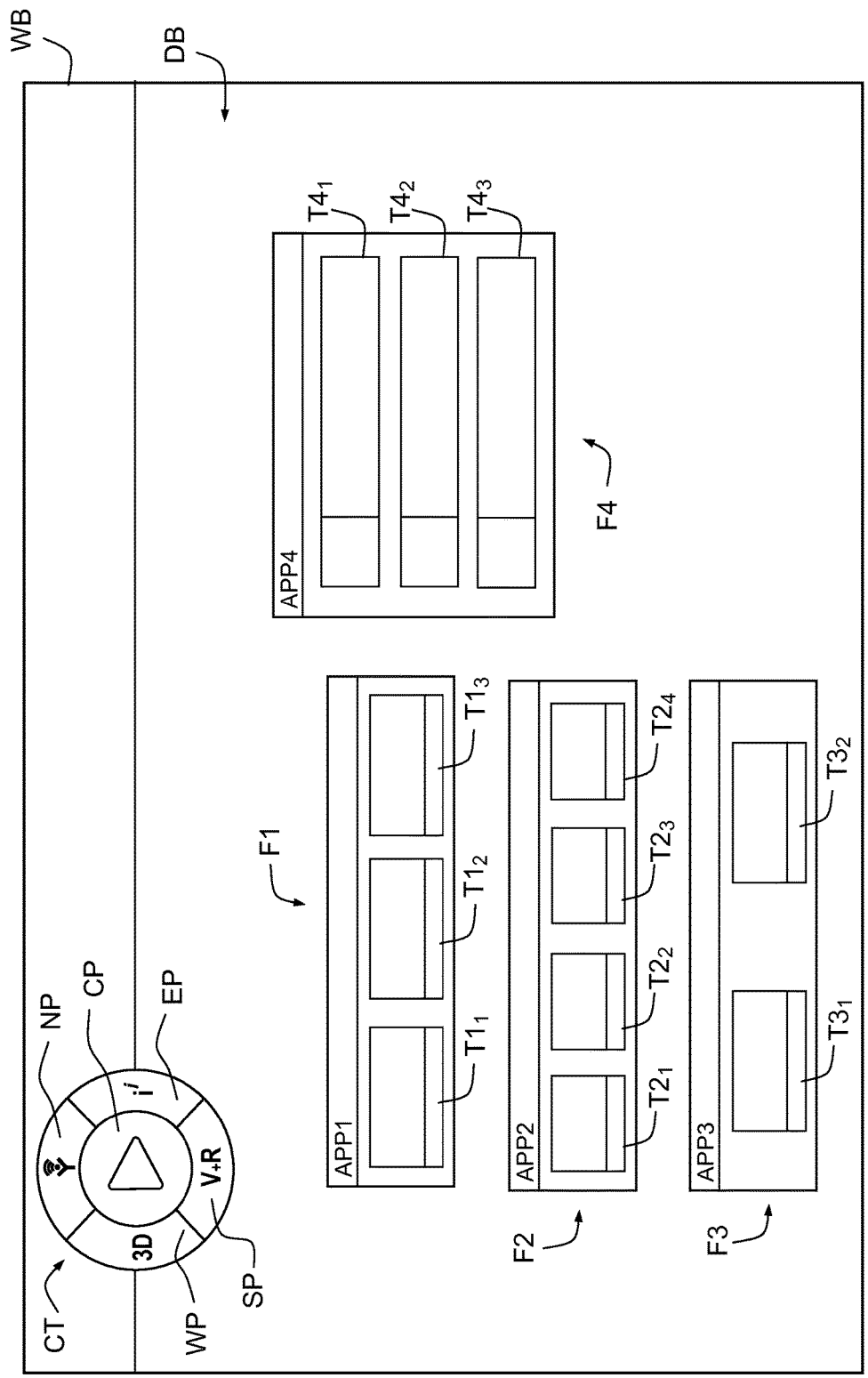
FIG. 2 illustrates an example of web browser with a dashboard, according to an aspect of the invention.

On FIG. 2, is represented, a web browser WB with a dashboard DB. To access this page, the user has to log him with a login and a password.

The user has to first create an account, wherein he has to provide personal data, a login, generally his mail address, and a password, and accept conditions of use.

When he logs for the first time, he can create his own personalized dashboard, with for example parts with respective links to different online web applications and objects of these applications (for example different video files of the video-sharing website known under the trademark You Tube and/or different files of the internet search engine known under the trademark Google and/or different 3D objects collaborative or not of applications like).

On FIG. 2 is represented an example of dashboard with a command tool CT, for example disposed on the upper left side of the window of the web browser.

The command tool CT is more detailed in the following description relative to FIGS. 6a to 6g.

On this example, the dashboard of the user can comprise four frames F1, F2, F3, F4, corresponding to four different applications APP1, APP2, APP3, APP4 and objects readable/editable with the corresponding application.

For example, the three applications APP1, APP2, APP3 can be the applications provided by Dassault Systèmes respectively under the trademarks CATIA, DELMIA and SIMULIA, and the application APP4 can be the video-sharing website known under the trademark You Tube.

In each frame F1, F2, F3, F4, a plurality of thumbnails, respectively $T1_i$, $T2_i$, $T3_i$, $T4_i$ represent objects associated to the corresponding application APP1, APP2, APP3, APP4.

Each thumbnail is linked to the file or data representative of the corresponding object.

In the example of FIG. 1, the frame F1 of the application APP1 comprises three thumbnails $T1_1$, $T1_2$ and $T1_3$, the frame F2 of the application APP2 comprises four thumbnails $T2_1$, $T2_2$, $T2_3$ and $T2_4$, the frame F3 of the application APP3 comprises two thumbnails $T3_1$ and $T3_2$, and the frame F4 of the application APP4 comprises three thumbnails $T4_1$, $T4_2$ and $T4_3$.

The thumbnails $T1_i$, $T2_i$, $T3_i$, $T4_i$ can have for example a part for displaying an image and a part for displaying text about the corresponding object.

The command tool CT represented on the figures is a circular graphical user interface in the form of a compass comprises a central part CP, an upper or north part NP, a lower part or south part SP, a right or east part EP, and a left or west part WP.

Figure 3:
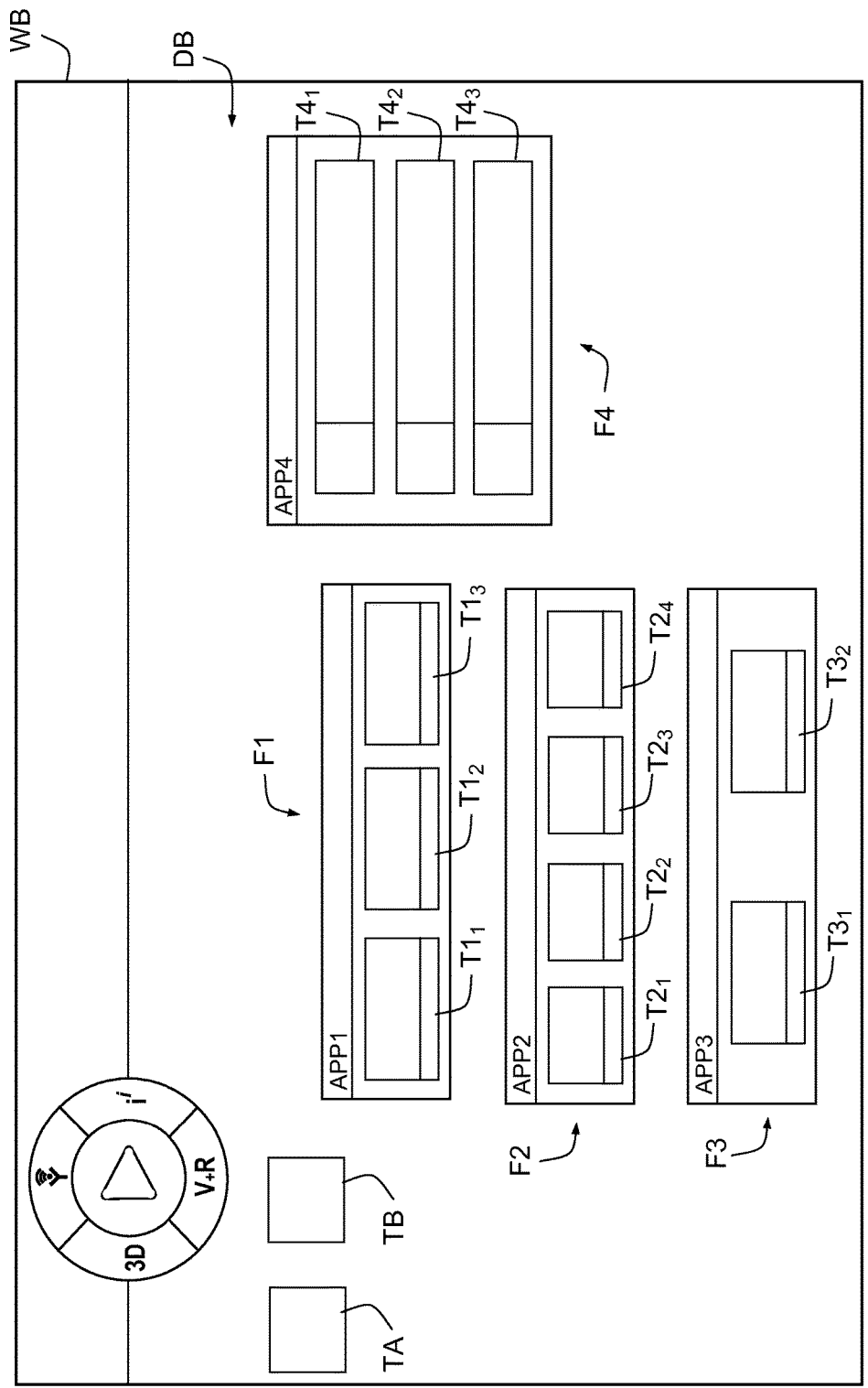
FIG. 3 illustrates a method according to an aspect of the invention.

The FIG. 3 illustrates the displaying of a list of at least one installed application(s), in the present example two thumbnails TA, TB representing two applications able to use the selected object(s), after the selection of at least one object by thumbnail(s) of FIG. 2.

The functioning of the command tool CT is described in view of the FIGS. 6a to 6g.

Figure 4:
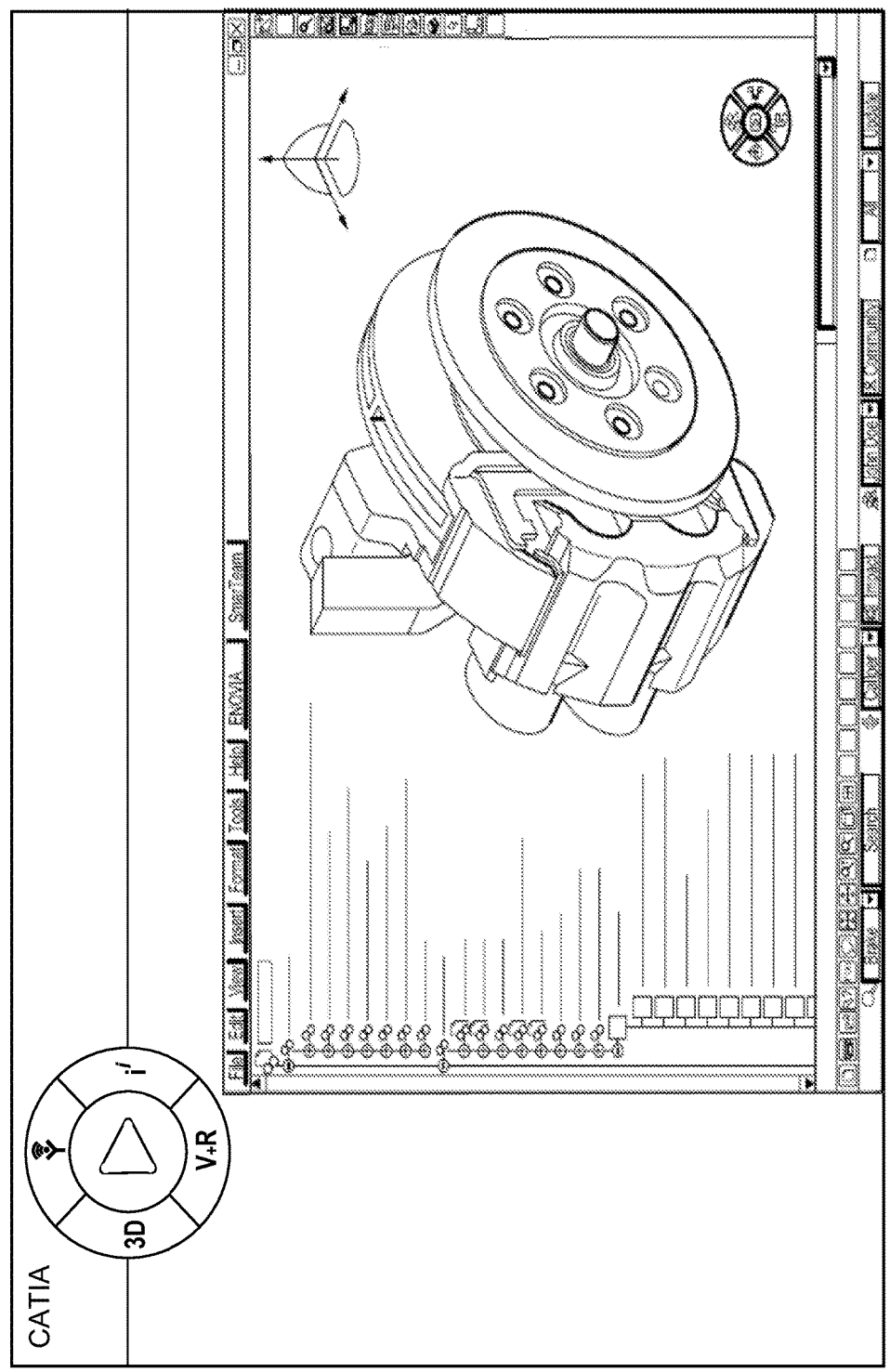
FIGS. 4 and 5 represent respectively the launching of an installed application, according an aspect of the invention.
Figure 5:
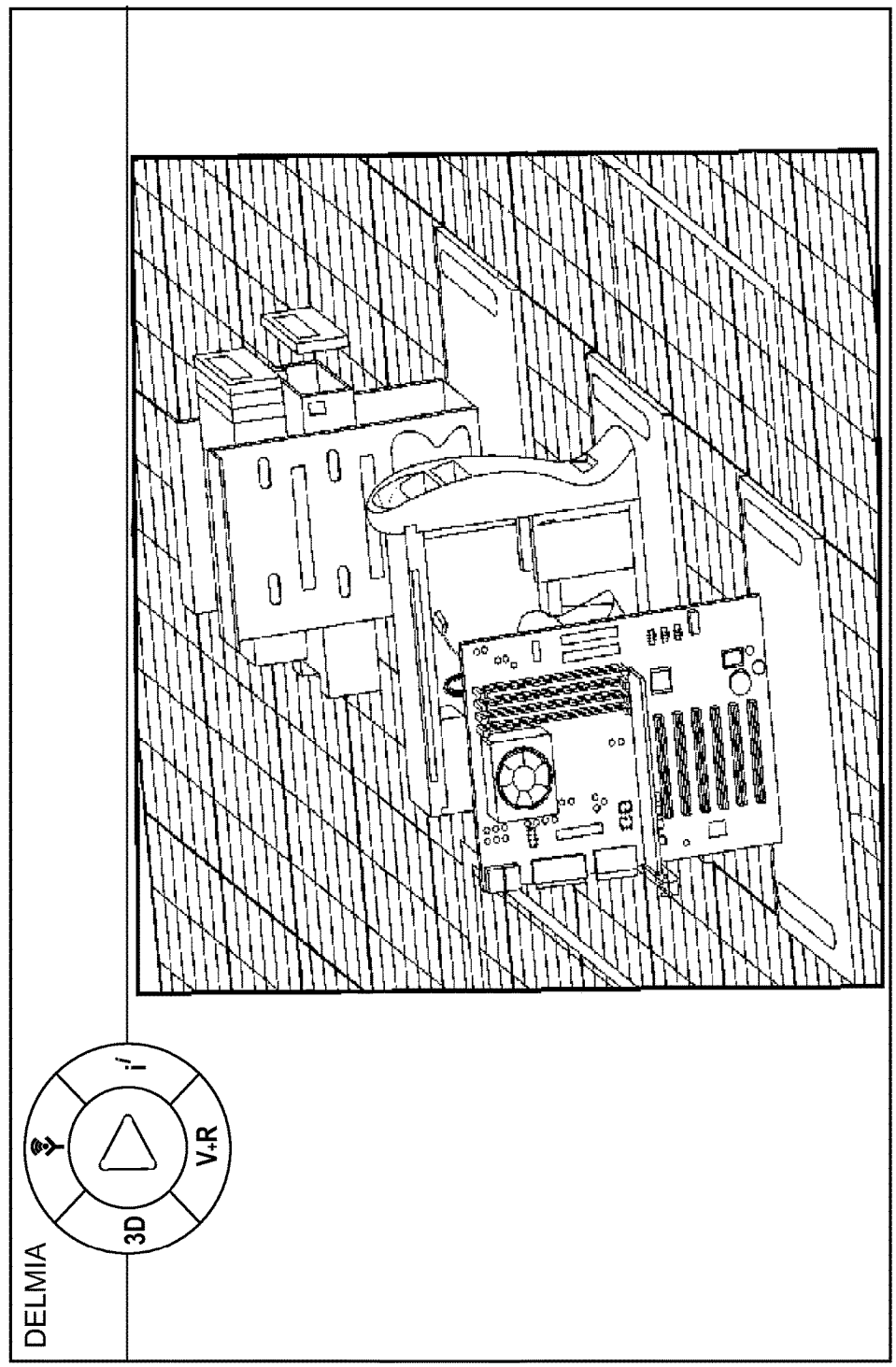

FIG. 4 illustrates an example of launching of CATIA application and FIG. 5 illustrates an example of launching of DELMIA application.

The transitions during the launching facilitates the work of the user, because he has not to relog at each launching, and the Graphical Machine Interface of said web browser and said selected application can be identical and at the launching of said selected application the options of its presentation can be matched with the options of presentations of the web browser. Thus it is transparent for the user, and the displaying is continue.

FIGS. 6a to 6g illustrate the functioning of the command tool or "compass" of the web browser and of the application(s), according to an aspect of the invention.

Figure 6A:
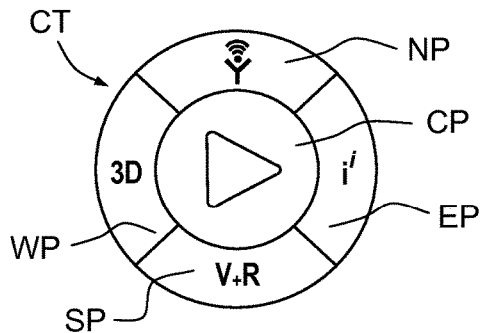
FIGS. 6a to 6g illustrate the functioning of the command tool of the web browser and of the application(s), according to an aspect of the invention.

On FIG. 6a, is represented the command tool comprising a central part CP, an upper or north part NP, a lower part or south part SP, a right or east part EP, and a left or west part WP.

Figure 6B:
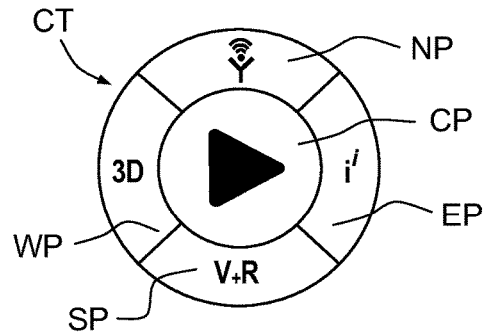
Figure 6C:
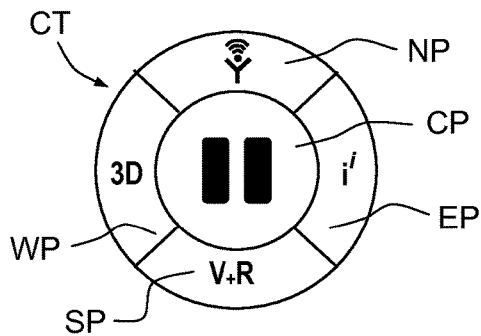

FIGS. 6b and 6c show the activation and pause of the central part CT, corresponding to a real time 3D experience platform or, in other words, an activation or pause by the user, for example by a click.

Figure 6D:
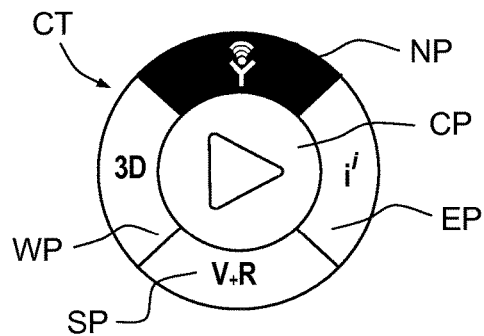

FIG. 6d shows the activation of the upper or north part NP corresponding to social and collaborative applications, such as the ones provided under the trademarks ENOVIA or SwYM, or, in other words, an activation by the user, for example by a click.

Figure 6E:
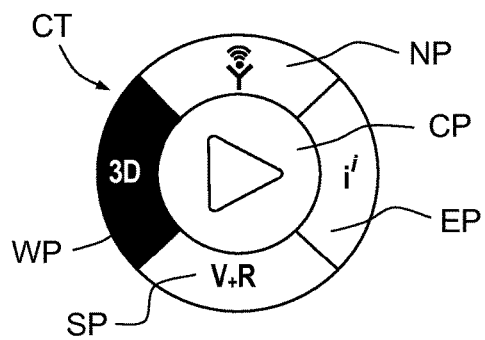

FIG. 6e shows the activation of the left or west part WP corresponding to 3D modeling applications, such as the ones provided under the trademarks CATIA, SolidWorks or GEOVIA, or, in other words, an activation by the user, for example by a click, entailing in the present example the displaying of a list of at least one installed application(s), like the two thumbnails TA, TB of FIG. 3. Others parts of the command tool CT operate similarly in function of the corresponding activation.

Figure 6F:
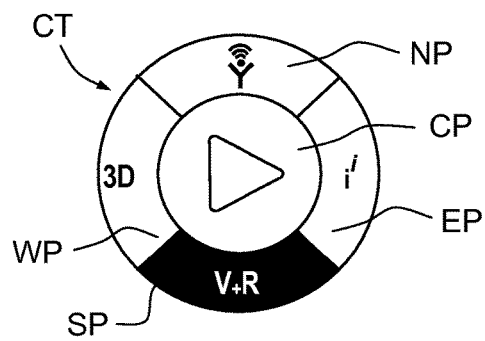

FIG. 6f shows the activation of the lower or south part SP corresponding to content and simulation applications, such as the ones provided under the trademarks SIMULIA, 3DVIA or DELMIA, or, in other words, an activation by the user, for example by a click.

Figure 6G:
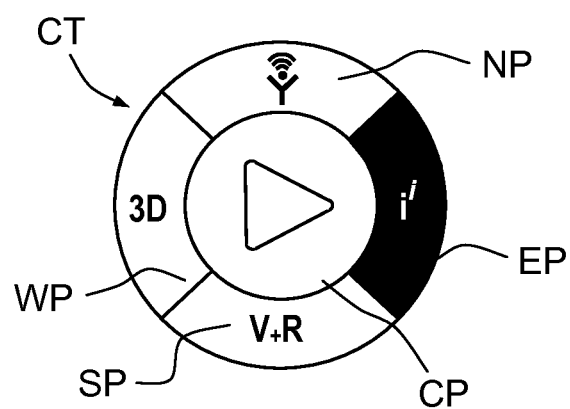
Figure 7:
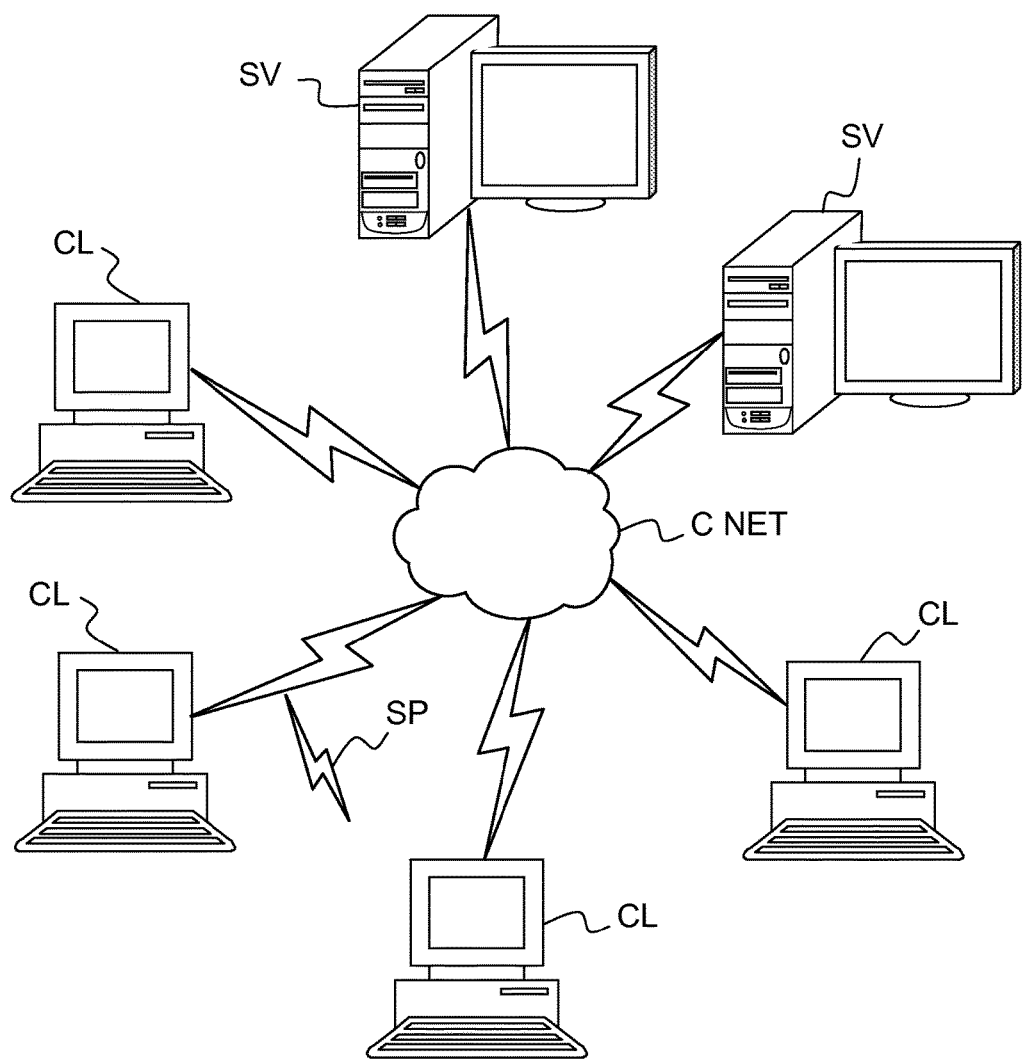
FIG. 7 illustrates a computer network or similar digital processing environment in which the present invention may be implemented.

FIG. 6g shows the activation of the right or east part EP corresponding to information intelligence applications, such as the ones provided under the trademarks Exalead or Netvibes, or, in other words, an activation by the user, for example by a click FIG. 7 illustrates a computer network or similar digital processing environment in which the present invention may be implemented.

Preferably, applications proposed in the second list are three-dimensional-based applications such as 3D modeling applications and content and simulation applications available through the north part NP, west part WP or south part SP of the command tool CT.

Client computer(s)/devices CL and server computer(s) SV provide processing, storage, and input/output devices executing application programs and the like. Client computer(s)/devices CL can also be linked through communications network CNET to other computing devices, including other client devices/processes CL and server computer(s) SV. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 8:
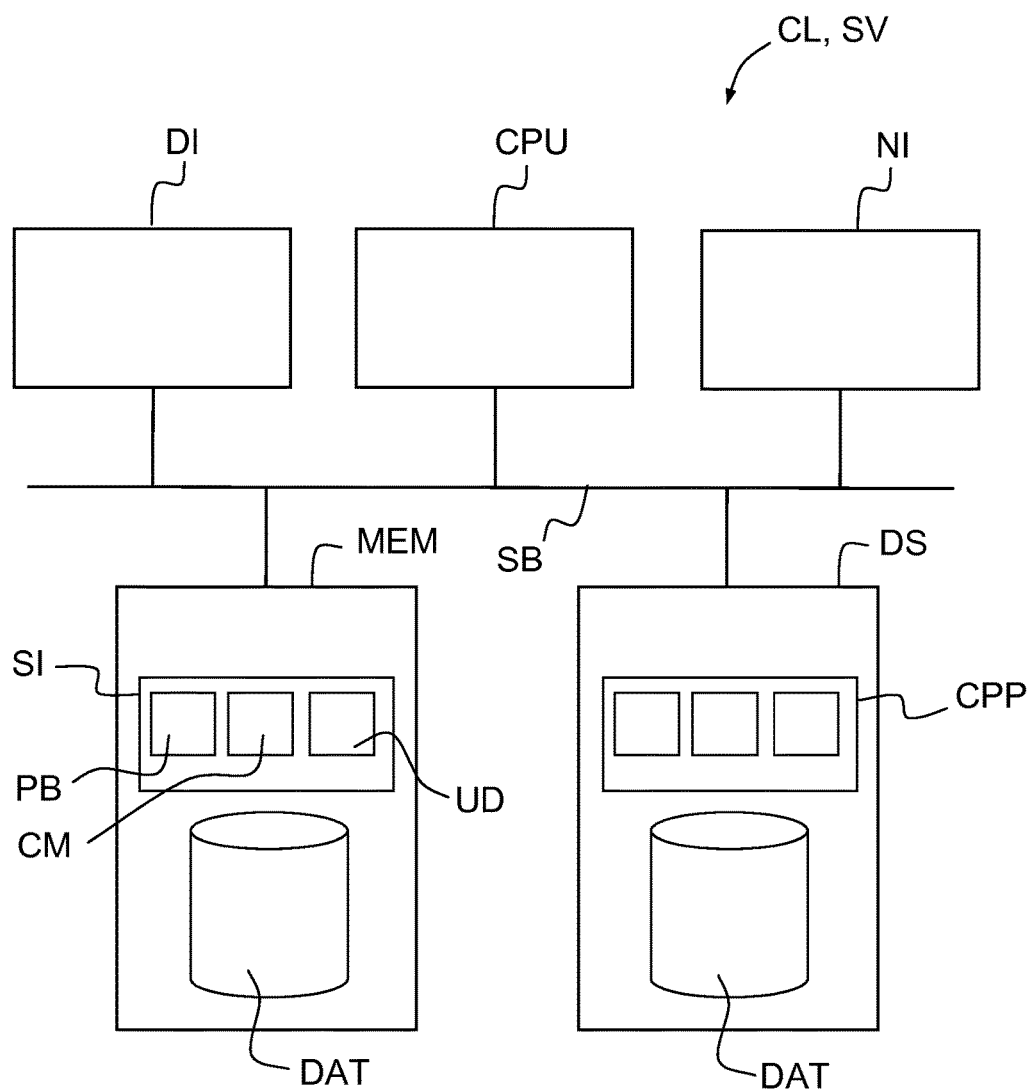
FIG. 8 illustrates a diagram of the internal structure of a computer.

FIG. 8 is a diagram of the internal structure of a computer (e.g., client processor/device CL or server computers SV) in the computer system of FIG. 7. Each computer CL, SV contains system bus SB, where a bus is a set of hardware lines used for data transfer among the components of a computer or processing system. Bus SB is essentially a shared conduit that connects different elements of a computer system (e.g., processor, disk storage, memory, input/output ports, network ports, etc. . . . ) that enables the transfer of information between the elements.

Attached to system bus SB is I/O device interface DI for connecting various input and output devices (e.g., keyboard, mouse, displays, printers, speakers, etc.) to the computer CL, SV. Network interface NI allows the computer to connect to various other devices attached to a network.

Memory MEM provides volatile storage for computer software instructions SI and data CPP used to implement an embodiment of the present invention (e.g., a first path builder PB, means CM for computing a second path, an updater UD implementing the method discussed in FIGS. 1 to 4, and supporting code detailed above).

Disk storage DS provides non-volatile storage for computer software instructions SI and data DAT used to implement an embodiment of the present invention. Central processor unit CPU is also attached to system bus SB and provides for the execution of computer instructions.

In one embodiment, the processor routines SI and data DAT are a computer program product (generally referenced CPP), including a computer readable medium (e.g., a removable storage medium such as one or more DVD-ROM's, CD-ROM's, diskettes, tapes, etc. . . . ) that provides at least a portion of the software instructions for the invention system. Computer program product CPP can be installed by any suitable software installation procedure, as is well known in the art.

In another embodiment, at least a portion of the software instructions may also be downloaded over a cable, communication and/or wireless connection. In other embodiments, the invention programs are a computer program propagated signal product SP embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program CPP.

In alternate embodiments, the propagated signal is an analog carrier wave or digital signal carried on the propagated medium. For example, the propagated signal may be a digitized signal propagated over a global network (e.g., the Internet), a telecommunications network, or other network.

In one embodiment, the propagated signal is a signal that is transmitted over the propagation medium over a period of time, such as the instructions for a software application sent in packets over a network over a period of milliseconds, seconds, minutes, or longer.

In another embodiment, the computer readable medium of computer program product CPP is a propagation medium that the computer system CL may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

While this invention has been particularly shown and described with references to example embodiments thereof, it will be understood by those skilled in the art that various changes in form and details may be made therein without departing from the scope of the invention encompassed by the appended claims.

The invention claimed is:

1. A computer-implemented method for launching an installed application comprising the steps of:
   providing a web browser;
   displaying in the web browser a first list of at least one three-dimensional modeled object;
   selecting at least one three-dimensional modeled object among said first list;
   determining a second list of at least one installed application able to use the selected at least one three-dimensional modeled object of the first list;
   displaying in the web browser said second list;
   selecting an application in said second list; and
   launching said selected application of said second list together with an opening of the selected at least one three-dimensional modeled object of the first list.

2. The method of claim 1, wherein said first list is stored on a server connected to a memory means storing said at least one three-dimensional modeled object of said first list, and said at least one application of said second list is stored on a client.

3. The method of claim 1, wherein a Graphical Machine Interface of said web browser and of said selected application are identical, and at the launching of said selected application, options of its presentation are matched with options of presentations of the web browser.

4. The method of claim 1, wherein said step of launching of said selected application with several three-dimensional modeled objects of said first list, storable on different data bases, is adapted to automatically launch several corresponding instances of the application.

5. The method of claim 1, wherein the web browser and the at least one installed application of the second list have an identical command tool.

6. The method of claim 1, wherein said second list comprises at least one of: a three-dimensional Computer-Aid Design application, a Computer-Aided Engineering application, and a Computer-Aided Manufacturing application.

7. The method of claim 1, wherein an installed application is eligible for said second list, if the installed application is an authorized licensed application.

8. A non-transitory computer-readable medium comprising:
   a memory area having computer-executable instructions configured to cause a computer system to perform:
   providing a web browser;
   displaying in the web browser a first list of at least one three-dimensional modeled object;
   selecting at least one three-dimensional modeled object among said first list;
   determining a second list of at least one installed application able to use the selected at least one three-dimensional modeled object of the first list;
   displaying in the web browser said second list;
   selecting an application of said second list; and
   launching said selected application of said second list together with an opening of the selected at least one three-dimensional modeled object of the first list.

9. A computer program product, comprising:
   a non-transitory computer readable medium configured for launching an installed application in a computer system;
   code means stored on the computer readable medium and when executed by a computer causes the computer system to:
   provide a web browser;
   display in the web browser a first list of at least one three-dimensional modeled object;
   select at least one three-dimensional modeled object among said first list;
   determine a second list of at least one installed application able to use the selected at least one three-dimensional modeled object of the first list;
   display in the web browser said second list;
   select an application in said second list; and
   launch said selected application of said second list together with an opening of the selected at least one three-dimensional modeled object of the first list.

10. An apparatus for launching an installed application of a computer-aided system comprising:
    means for providing a web browser;
    display means displaying in the web browser a first list of at least one three-dimensional modeled object;
    user interface means for selecting at least one three-dimensional modeled object among said first list;
    processor means for determining a second list of at least one installed application able to use the selected at least one three-dimensional modeled object of the first list;
    the display means displaying in the web browser said second list;
    the user interface means enabling user selection of an application of said second list; and processor means for launching said selected application of said second list together with an opening of the selected at least one three-dimensional modeled object of the first list.

11. The apparatus of claim 10 wherein said first list is stored on a server connected to a memory means storing said at least one three-dimensional modeled object of said first list, and said at least one installed application of said second list is stored on a client.

12. The apparatus of claim 10 wherein a Graphical Machine Interface of said web browser and of said selected installed application are identical, and at the launching of said selected application, options of its presentation are matched with the options of presentations of the web browser.

13. The apparatus of claim 10 wherein the processor means (a) launches the selected application with plural three-dimensional modeled objects on the first list and storeable on different data bases, and (b) is adapted to automatically launch multiple corresponding instances of the selected application.

14. The apparatus of claim 10 wherein the web browser and the at least one installed application of the second list have an identical command tool.

15. The apparatus of claim 10 wherein said second list comprises at least one of a: three-dimensional Computer-Aid Design application, a Computer-Aided Engineering application, and a Computer-Aided Manufacturing application.

16. The apparatus of claim 10 wherein an installed application is eligible for said second list, if the installed application is an authorized licensed application.

* * * * *